US006611749B1

(12) United States Patent
Berwanger et al.

(10) Patent No.: US 6,611,749 B1
(45) Date of Patent: Aug. 26, 2003

(54) BINARY TRANSMISSION SYSTEM

(75) Inventors: Christian Berwanger, Düsseldorf (DE); Christian Hort, Düsseldorf (DE); Ralf Kriesinger, Meerbusch (DE); Werner Schulz, Meerbusch (DE); Stefan Vieweg, Willich (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/868,081

(22) PCT Filed: Dec. 6, 1999

(86) PCT No.: PCT/DE99/03951

§ 371 (c)(1),
(2), (4) Date: Aug. 14, 2001

(87) PCT Pub. No.: WO00/36771

PCT Pub. Date: Jun. 22, 2000

(30) Foreign Application Priority Data

| | | |
|---|---|---|
| Dec. 14, 1998 | (DE) | 198 59 599 |
| Mar. 9, 1999 | (DE) | 199 11 676 |

(51) Int. Cl.[7] .......... G08G 1/09; H04B 1/18
(52) U.S. Cl. .......... 701/117; 701/118; 701/119; 340/905; 455/186.1
(58) Field of Search .......... 701/117, 118, 701/119; 340/905; 455/186.1

(56) References Cited

U.S. PATENT DOCUMENTS

| | | | | | |
|---|---|---|---|---|---|
| 5,020,143 | A | * | 5/1991 | Duckeck et al. | 340/905 |
| 5,193,214 | A | * | 3/1993 | Mardus et al. | 340/905 |
| 5,206,641 | A | * | 4/1993 | Grant et al. | 340/905 |
| 5,276,909 | A | * | 1/1994 | Milner et al. | 340/7.48 |
| 5,465,088 | A | * | 11/1995 | Braegas | 340/905 |
| 5,635,924 | A | * | 6/1997 | Tran et al. | 340/905 |
| 5,900,825 | A | * | 5/1999 | Pressel et al. | 340/905 |
| 5,933,094 | A | * | 8/1999 | Goss et al. | 340/905 |
| 5,987,382 | A | * | 11/1999 | Weishaupt et al. | 340/995 |
| 6,018,649 | A | * | 1/2000 | Ruhl | 455/186.1 |
| 6,173,165 | B1 | * | 1/2001 | Ruhl et al. | 455/186.1 |

* cited by examiner

*Primary Examiner*—Michael J. Zanelli
*Assistant Examiner*—Eric M Gibson
(74) *Attorney, Agent, or Firm*—Cohen, Pontani, Lieberman & Pavane

(57) ABSTRACT

Optimized, universal transmission of traffic information and the coding thereof by different terminals is permitted in a simple, inexpensive and efficient manner by apparatuses and a method for transmitting traffic information relating to a road traffic network from a traffic information control center to at least one terminal. In the control center, the segments of the road traffic network which are affected by the traffic information are either coded using a location coordinate table, available in the control center, in a form which represents the location of the segments, or are coded using a segment table, available in the control center, in a form which represents the identity of the segments without their location. The control center transmits to the terminal a selection information item which indicates which of the two above codings is used in the transmitted information.

21 Claims, 3 Drawing Sheets

| GEOCODE 1 (30) | GEOCODE 2 (31) | LOCATION 1 (32) | LOCATION 2 (33) | SEGMENT AFFECTED BY GEOCODE (34) | OUTPUT/LOCATION (35) |
|---|---|---|---|---|---|
| 12345678 | | 12°34'W56°78N | | 2,3,11,12 | "MUNICH AREA" |
| 12345679 | 12345680 | 12°34'W56°79N | 12°34'W56°82N | 12 | "A9 NORTHBOUND, MUNICH TO NUREMBERG" |

12

FIG.3

BINARY TRANSMISSION SYSTEM

CROSS-REFERENCE TO RELATED APPLICATIONS

This is a national stage of PCT application no. PCT/DE99/03951, filed on Dec. 6, 1999. Priority is claimed on that application and on patent application no. 198 59 599.9, filed in Germany on Dec. 14, 1998, and on patent application no. 199 11 676.8, filed in Germany on Mar. 9, 1999.

BACKGROUND OF THE INVENTION

The invention relates to a method for transmitting traffic information relating to a road traffic network from a traffic information control center to at least one terminal, and to apparatuses for carrying out the method.

Traffic information is.usually transmitted from a traffic information control center to a terminal wirelessly (by radio). The relatively low and expensive radio transmission capacities mean that compressed coding is necessary.

The person skilled in the art is familiar with the practice of using RDS transmission methods (RDS-TMC) for traffic information. RDS (radio data system) relates to the transmission of digital alphanumeric information via a radio channel, similar to the transmission of Teletext information via television channels. When traffic information is transmitted using RDS-TMC, tables associating defined segments of all the relevant roads with particular codes for transmission are usually used in the traffic control center and in the terminal. This has the advantage of a very short transmission sequence for a road section, but has the drawbacks of relatively expensive terminals which are reliant on the implementation of the above tables, and of transmissions tied to the table codes of the segments.

By contrast, DE 197 50 786 A1 discloses the practice of using geographical location coordinate data given in a form compressed on a prescribed basis, and using additional location data representing roads, for example by means of text statements ("A8"), to transmit traffic information with the geographical location coordinates of segments indicated in traffic information which is to be transmitted. This transmission method has the advantage that it can be used even on very inexpensive traffic information terminals. With suitably coded transmission, it is also conceivable for transmission to be in the form of a short message to normal mobile radio terminals for display there in a text field of sufficient size. A drawback in this case is the relatively large quantity of data which needs to be transmitted (on account of the additional location data transmitted) as compared with the referencing of road sections on the basis of the above RDS-TMC method.

The document EP 0 725 505 A1 describes a radio receiver for receiving and for managing and reproducing digitally coded traffic reports containing location details and event details. The digitally coded traffic reports received are supplied to a device for decoding, with location-related data necessary for decoding the traffic reports being stored on an interchangeable data medium. Reproduction data can be derived from the decoded traffic reports, with further location-related data required for deriving the reproduction data being stored on the interchangeable data medium. The reproduction data can be supplied to a reproduction device.

SUMMARY OF THE INVENTION

It is an object of the present invention to provide a transmission method for traffic information which permits both compressed transmission (with a small quantity of information to be transmitted, as in the above RDS-TMC method) and transmission of traffic information in a form which can be decoded by simple terminals.

The inventive embodiment of the transmission method and of the terminals and traffic information control centers using the transmission channel for this purpose permits selective transmission of traffic information either using location coordinate data which are produced using a location coordinate table and directly represent the location coordinates of traffic segments which are to be transmitted (and possibly additional information, like the name of traffic segments or traffic segment sections, such as "A8" or "A8, Munich/Pasing exit), or using segment identities coded with a segment table which is available in a control center without direct (direct=can be determined without table of location and identities) statement of the geographical location of said segments. The terminal is able to determine the type of coding for the received, transmitted traffic information (that is to say whether it is segment identity data using location coordinate data or using the identity of segments for the purpose of representation) on the basis of the selection information transmitted in the traffic information. The selection information is expediently indicated in the form of a flag in the transmitted traffic information.

The transmitting step may include transmitting in two transmission cycles which are shifted in time with respect to each other. Transmission within each transmission cycle is effected using only one coding including either location coordinate data or segment identity data such that a first cycle uses one of the location coordinate data or segment data and a second coding uses the other of the location coordinate data or segment data.

Further features and advantages of the invention can be found in the subclaims and in the description below of an exemplary embodiment with reference to the drawing.

BRIEF DESCRIPTION OF THE DRAWINGS

FIG. 3 shows a cross-referencing table containing location coordinate data (which may be transmitted alone or with additional information and may be output without a table) and associated segments.

DETAILED DESCRIPTION OF THE PREFERRED EMBODIMENTS

Figure 1:
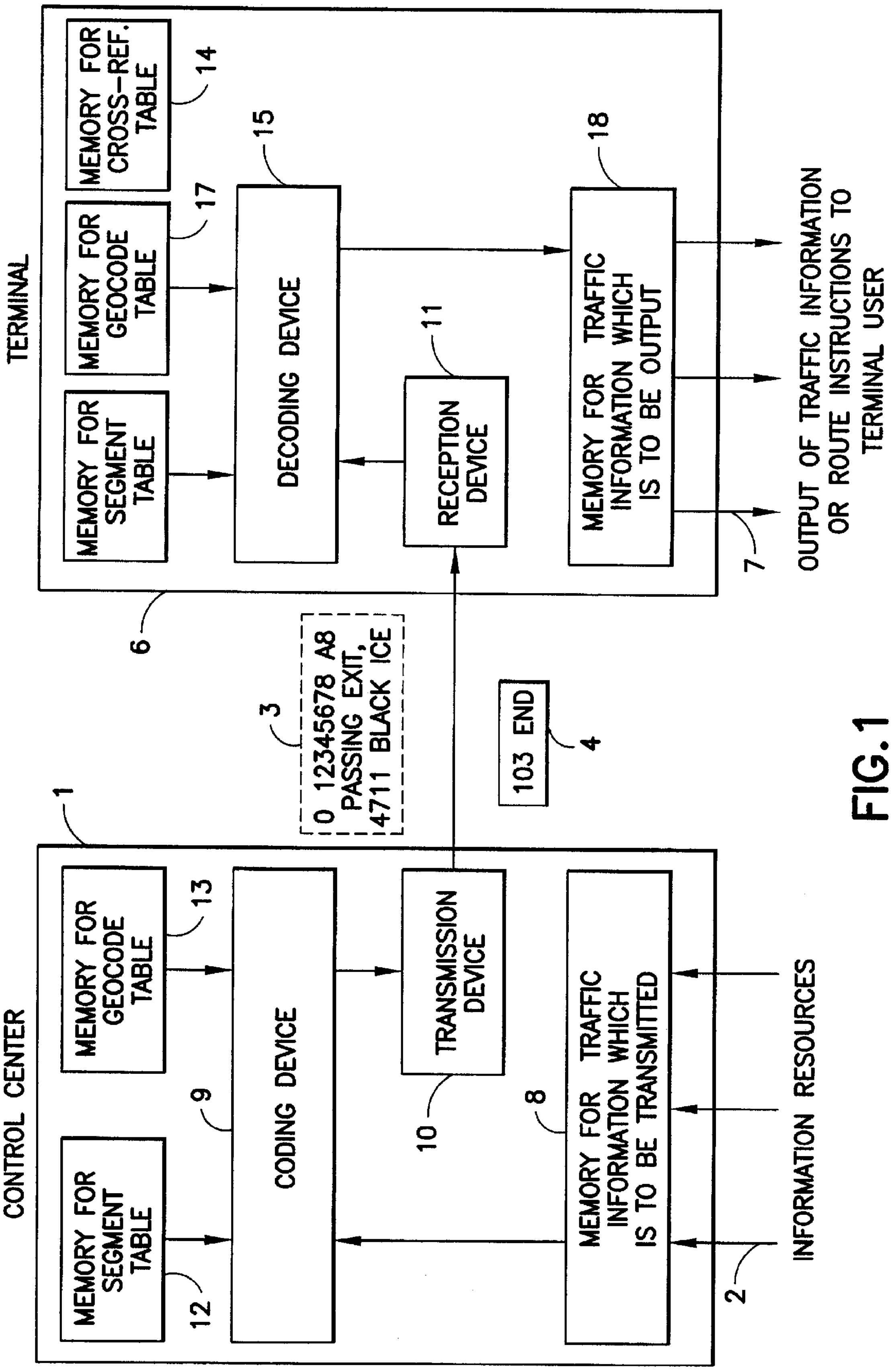
FIG. 1 shows, in block diagram form, a traffic information control center, traffic information transmitted therefrom and a terminal receiving the traffic information.

FIG. 1 shows a control center 1 which receives traffic information from different information sources 2 (for example stationary traffic detectors along the roads of the traffic network, detectors/FCD moving along with the traffic in vehicles, state registration points etc.) and transmits traffic information 3, 4 in variously coded form to (possibly different) terminals 6, from which (6) traffic information or route instructions based on this information is/are output to terminal users by (for example visual or audio) output devices 7.

The traffic information control center 1 stores its traffic information received from different information sources 2 in a memory 8 for traffic information which is to be transmitted. The traffic information can be stored in the memory 8 or in another memory directly (in this context, possibly quantized in gradations representing various speed ranges) or (particularly for traffic information in the form of route instructions) in revised form. A coding device 9 is used to code the traffic information to be transmitted in the memory 8 in a form suitable for transmission and to transmit it to a transmission device 10. The transmission device 10 transmitting the traffic information 3 may be any radio device. It may be a radio transmission device, in particular an RDS transmission device or a link to an RDS transmission device, or a mobile radio transmission device or a link to a mobile radio transmission device; a mobile radio transmission device can, in particular, transmit the information using a mobile radio data channel (TCH data channel or traffic data channel) or a control channel, like the broadcast message data channel (BCH in GSM). Accordingly, the reception device 11 of the terminal 6 is designed either for receiving via a radio channel (RDS-TMC channel or the like) or a mobile radio channel or both.

The coding device 9 of the. control center 1 uses the segment table stored in the memory 12 or the geocode table stored in the memory 13 to code traffic information which is to be transmitted.

A table stored in the memory 12 is shown by way of example in FIG. 3. In this example, a segment (with the number 1, 2, 3 . . . , 11, 12 etc.) represents a respective segment of a road traffic network. A segment may be a road. A segment may also be a road section. It is also possible to define a segment for one or more lanes with the same or different directions of travel. on a road or road section. In addition, a text information item which is to be transmitted (7) from the terminal may be stored in a memory with segments. For each segment, FIG. 3 indicates, by way of example, a text information item which is to be output (7) from the terminal 6, such as "A9 Northbound, Munich to Nuremberg" for the segment 12.

Columns 30 and 31 in FIG. 3 indicate respective location coordinate data (=geocodes) representing coordinates on the basis of columns 32, 33. "12345678" represents the coordinates 12°34'W56°78'N, for example. A segment 12 may also be attached to a plurality of location coordinate data (12345678, 12345679). Column 34 shows segment identity data which may optionally likewise be transmitted.

Information 4 transmitted in table-coded form (in FIG. 1), namely "1-3-0-End", comprises a selection information item (first "1"), which indicates that the traffic information represents segments with no statement of their location by means of their identity, a statement for at least one segment (second "1" in 4) represented in the traffic information, the information (possibly dispensed with in the case of route instructions) relating to the average speed in these segments ("0" for speed 0 km/h or jam) using any defined quantlzation and an end symbol ("End") indicating the end of the segment information.

By contrast, the traffic information 3 represents the location of segments in the traffic information using transmitted location coordinate data (in this case with additional location data). The transmitted traffic information 3 likewise starts with selection information which uses the leading "0" of the decoding device 15 of the terminal 6 to show that a name for the location of segments comes next. Instead of being transmitted in a leading position, as shown, the selection information may also be transmitted at the end of the sequence or in the middle. The location coordinate data "1, 2, 3, 4, 5, 6, 7, 8" following the selection information represent 12°34' west, 56°58' north, for example. Moreover, additional location information "A8, Pasing exit" is indicated which, in very simple terminals 6, may be output (7) in the form of text without prior revision or processing with tables, and also coded ("4711") and/or uncoded ("black ice") information relating to states of the segments concerned. Coded information, such as "4711", may, by way of example, represent a speed of 47.11 km/h in the segments concerned. Uncoded information, such as "jam" or "black ice", may also be output directly in simple terminals. Traffic information 3 with location coordinate data representing locations of segments may be decoded by the coding device 15 using a geocode table (identical to the table in the memory 13) stored in the memory 17 (as in FIG. 5 for example). More complex terminals having such a geocode table (=location coordinate table) can thus associate the traffic information 3 with individual segments in great detail and can formulate highly specific outputs 7 for the terminal user, possibly using a digital map etc. Simpler terminals 15 can output the transmitted location coordinate data and/or the transmitted text information without processing.

The coding (that is to say using location coordinates or segment identities) can be selected in the control center by, for example, asking for manual input from an operator or, for example in the case of a traffic information request from a terminal a the control center, by means of a statement in the request.

A cross-reference table (in the memory 14 in FIG. 1) as shown in FIG. 3 permits received segment identities to be inferred at the terminal end without direct (that is to say decodable as a location without a table) statement of location for locations, e.g. segment 12 at 12°34' west; 56°78' north etc.

Figure 2:
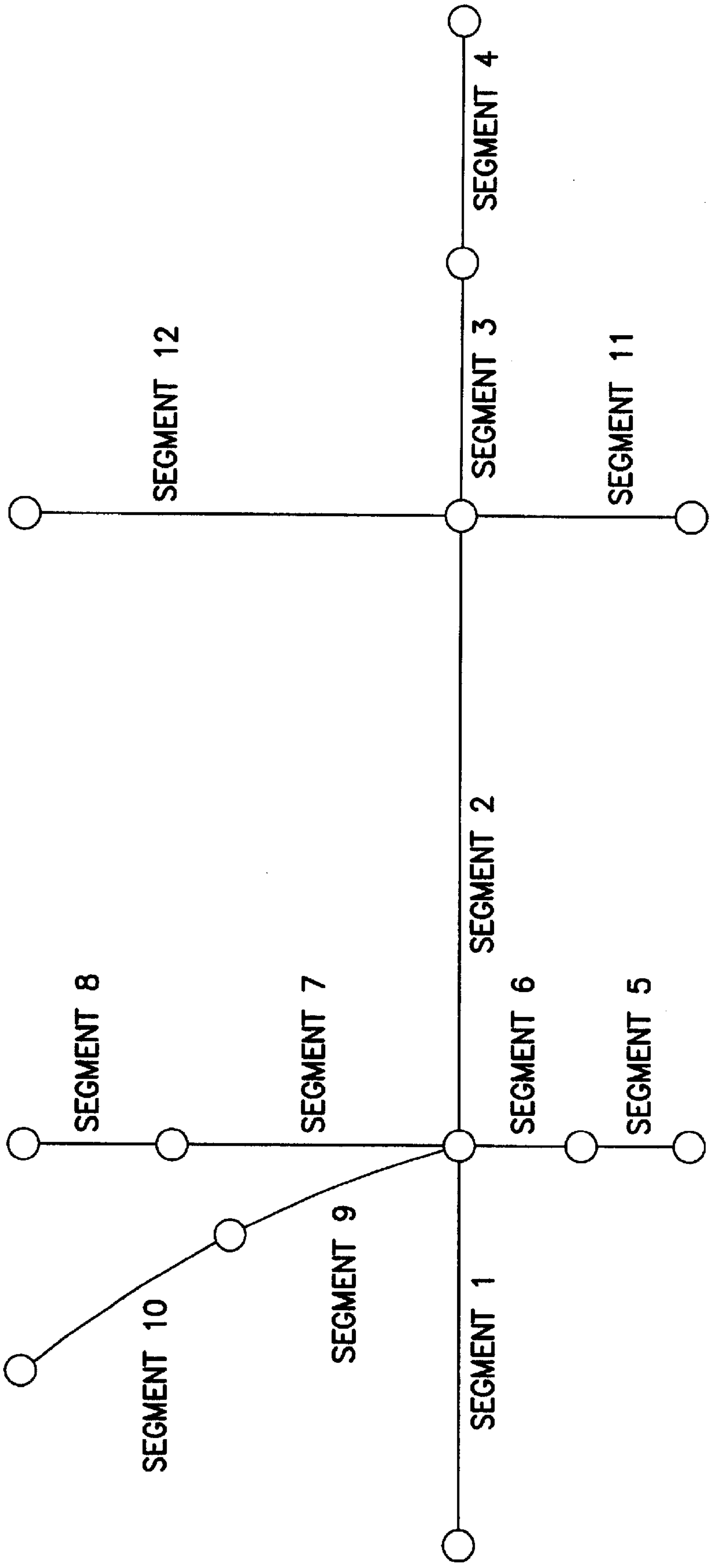
FIG. 2 shows an example of a coding for roads and/or road sections using segment identities denoting segments of the road.

FIG. 2 shows an example of the coding for a road traffic network using segments. The segments 1 to 11 each end at junctions, exits, turnoffs etc. Turnoffs to lower class roads (for example from a highway to an ordinary road, as between segments 7 and 8) are shown only to the relevant extent (that is to say in the form of the expressway with the turnoff) in this case. Instead of one segment as in this case, it is also possible for more than one segment to be used for the different directions and/or lanes of a road section.

The invention can be implemented in a traffic information control center and in the terminal as a program or as an electronic circuit. It is not limited to being implemented in the form of a program, however.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for transmitting traffic information relating to a road traffic network from a traffic information control center to at least one terminal, comprising the steps of:

coding, in the control center, segments of the road traffic network which are affected by the traffic information selectively using one of a location coordinate table, available in the control center, in a form which represents location of the segments, and a segment table, in the control center, in a form which represents identity of the segments without their location; and transmhitting from the control center to the terminal a selection information item which indicates which of the two codings is used in the transmitted information.

2. A method as defined in claim 1, including transmitting for the segments additional information relating to a state of the coded segments.

3. A method as defined in claim 2, wherein the additional information contains at least one of journey times, speeds and delay times in the segments represented by location coordinate data or segment identities.

4. A method as defined in claim 1, wherein the transmitting step includes transmitting information by radio.

5. A method as defimed in claim 4, including transmitting by RDS-TMC.

6. A method as defined in claim 1, wherein the transmitting step includes transmitting by mobile radio.

7. A method as defined in claim 6, including transmitting by mobile radio broadcasting.

8. A method as defined in claim 1, wherein the transmitting step includes transmitting using only one coding.

9. A method as defined in claim 1, wherein the transmitting step includes transmitting in two transmission cycles which are shifted in time with respect to one another, transmission within a transmission cycle being effected only using a respective coding with either location coordinate data or segment identity data, a first coding with either location coordinate data or segment identity data being used in one transmission cycle, and, if necessary, the other coding with, accordingly, either segment identity data or location coordinate data being used in the second transmission cycle.

10. A method as defined in claim 1, wherein the transmitting step includes coded transmission using identities of segments without direct statement of location, location of the segments being determined in the terminal based on a cross-reference table of segment identities and associated locations.

11. A method as defined in claim 1, wherein the selection information item is an additional information item transmitted outside of the location coordinate data and segment identity data.

12. A method as defined in claim 1, wherein the selection information item is implicitly contained in the location coordinate data and segment identity data which code the segments by virtue of the codes used for the location coordinate data being different than those for the segment identity data.

13. A terminal for transmitting traffic information relating to a road traffic network, comprising:

a reception device for receiving traffic information relating to segments of a road traffic network, which is sent from a traffic information control center;

a memory for storing identities of segments represented in transmitted traffic information and for storing information which is one of to be output for this purpose and to be used for other calculations, said memory comprising a plurality of memories for storing received traffic information which has a respective coding;

a decoding device operatively connected to the reception device and the memory so as to use either a location coordinate table or a segment table to decode segment statements which are received using the reception device and are coded either by their location or by their identity statements, the decoding being selected based on a selection information item which is likewise received, the decoding device being operative for decoding information received with more than one coding based on the coding and storing it in the plurality of memories, and further comprising means for selecting information which is processed further or displayed;

an output device connected to the decoding device for outputting one of decoded traffic information and navigation instructions produced using the traffic information to a user of the terminal;

a memory having a. cross-reference table which permits association of identities of segments and locations of segments; and an association apparatus which associates received identities of segments with their location based on the cross-reference table for output to a terminal user.

14. A terminal as defined in claim 13, wherein the reception device is one of a radio receiver and a link to a radio receiver.

15. A terminal as defined in claim 14, wherein the reception device is an RDS-TMC receiver.

16. A terminal as defined in claim 13, wherein the reception device is one of a mobile radio terminal and a link to a mobile radio terminal.

17. A traffic information control center for transmitting traffic information relating to a road traffic network, comprising:

a first memory for a location coordinate table which contains location coordinates of road segments;

a second memory for a segment identity table which contains for segments a respective identity statement for the segment;

a coding devive operative to code, for traffic information which is to be sent, segments affected by the traffic information which is to be sent selectively using one of location coordinates and identify statements, and to add thereto a selection information item representing the tipe of coding; and a transmission device for sending traffic information coded by the coding device.

18. A traffic information control center as defined in claim 17, wherein the transmission device is one of a radio transmission device and a link to a radio transmission device.

19. A traffic information control center as defined in claim 18, wherein the transmission device is one of an RDS-TMC transmission device and a link to an RDS-TMC transmission device.

20. A traffic information control center as defined in claim 17, wherein the transmission device is one of a mobile radio transmission device and a link to a mobile radio transmission device.

21. A traffic information control center as defined in claim 20, wherein the transmission device is one of a mobile radio broadcast short message transmission device and a link to a mobile radio broadcast short message transmission device.

* * * * *